United States Patent [19]

Otoide et al.

[11] Patent Number: 5,518,400

[45] Date of Patent: May 21, 1996

[54] PORTABLE RADAR TARGET SIMULATOR

[75] Inventors: Bill H. Otoide, Manhattan Beach; John K. Keigharn, Rancho Palos Verdes, both of Calif.

[73] Assignee: Hughes Aircraft Company, Los Angeles, Calif.

[21] Appl. No.: 339,630

[22] Filed: Nov. 15, 1994

[51] Int. Cl.⁶ ........................................................ G01S 7/40
[52] U.S. Cl. .............................. 434/4; 342/169; 342/171; 342/172
[58] Field of Search ............................. 434/4, 2; 342/169, 342/171, 172, 167

[56] References Cited

U.S. PATENT DOCUMENTS

| | | | |
|---|---|---|---|
| 4,450,447 | 5/1984 | Zebker et al. | 342/171 |
| 5,047,782 | 9/1991 | Lew et al. | 342/169 |
| 5,164,734 | 11/1992 | Fredericks et al. | 342/172 |

OTHER PUBLICATIONS

Paolella et al, "Fiber Optic Dual Delay Line for a Multi-Mode Radar Test Target Simulator", 1993 IEEE MTT-S International Microwave Symposium Digest, pp. 1059–1062.

*Primary Examiner*—Ian J. Lobo
*Attorney, Agent, or Firm*—Leonard A. Alkov; W. K. Denson-Low

[57] ABSTRACT

A radar target simulator for generating simulated targets used in testing a radar system. Simulated targets are generated out of the radar system noise. The radar system includes a radar receiver coupled to a receive antenna. The simulator has an input for sampling a transmitted output signal from the radar system. A first reference oscillator is provided for generating a first reference signal, and a first mixer is coupled to the first reference oscillator for mixing the first reference signal with the sampled signal from the radar system to provide a simulated target signal. A laser is coupled to the first mixer for generating a light output signal that corresponds to the simulated target signal. A plurality of selectable delay paths that each have a different predetermined delay length are coupled to the laser. A photodetector is coupled to the plurality of delay paths for conveying the light output signal derived from a selected one of the delay paths into a radio frequency (RF) simulated target signal. The photodetector is coupled to an output circuit for transmitting the RF simulated target signal to the radar system. A variable attenuator may be coupled between the photodetector and the output circuit for variably controlling the power of the RF simulated target signal. The simulator may further include Doppler signal generator that comprises a second reference oscillator for generating second and third reference signals. A third mixer is coupled to the first and second reference oscillators for mixing the first and second reference signals to produce a difference signal. A direct digital synthesizer is coupled to the second reference oscillator for receiving a command signal and the third reference signal, and for generating a Doppler output signal in response thereto. A fourth mixer is coupled to the second reference oscillator for receiving the third reference signal and to the direct digital synthesizer for receiving the Doppler signal, and for generating an intermediate Doppler signal in response thereto. A fifth mixer is coupled to the third and fourth mixers and to the output means for mixing the difference signal and the intermediate Doppler signal to produce a simulated target Doppler signal in response thereto that is the RF simulated target signal.

16 Claims, 1 Drawing Sheet

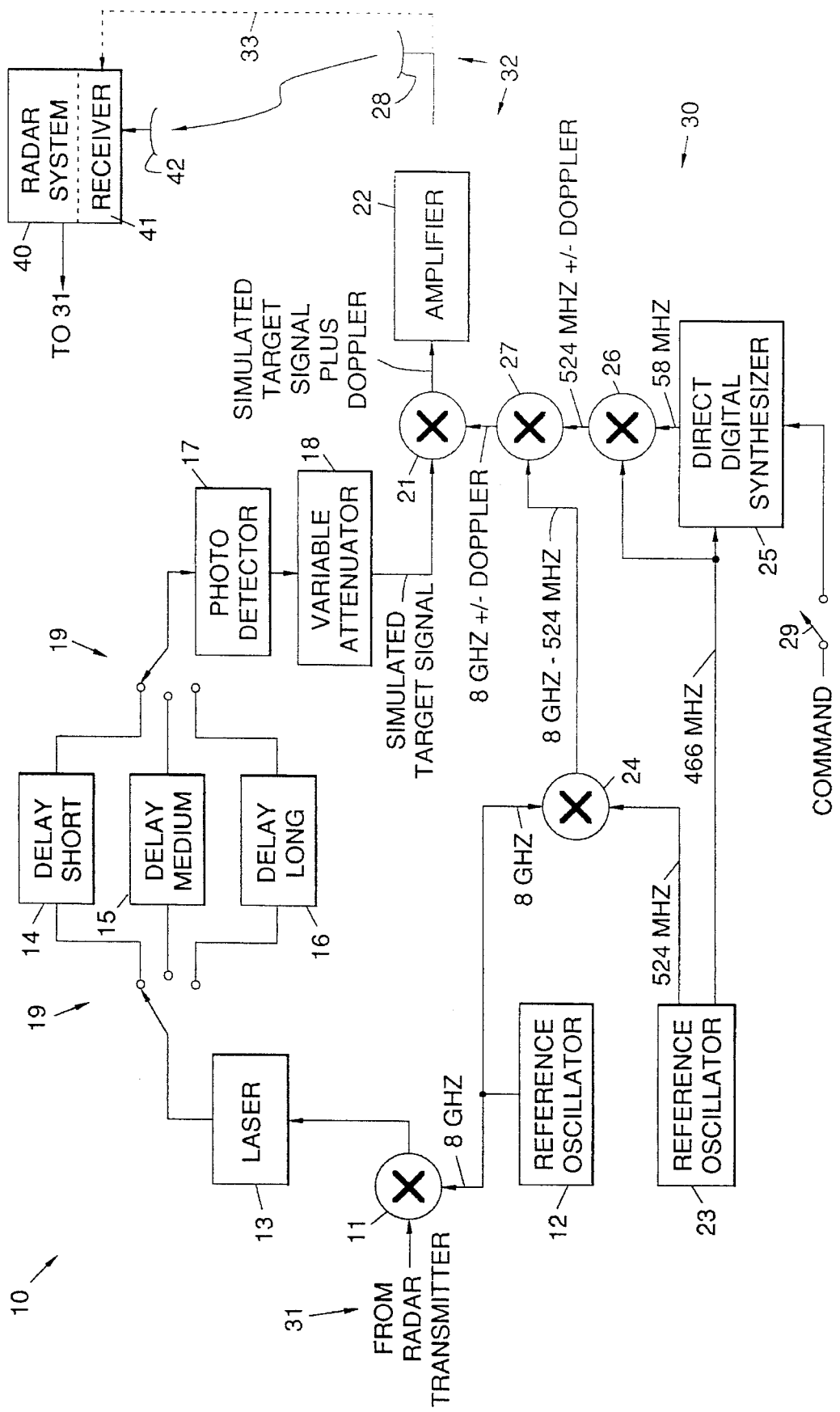

PORTABLE RADAR TARGET SIMULATOR

BACKGROUND

The present invention relates to radar target simulators, and more particularly, to a portable radar target simulator that employs fiber optic delay lines, variable power attenuation, and Doppler signal generation to provide for different simulated targets.

Conventional target simulators available today obtain information from a radar under test and reconstruct radar pulses after some user defined time delay. This reconstruction method works well in a laboratory environment, but is difficult to implement on a fight line. This is so because the information needed to reconstruct the radars pulses has become increasingly difficult to obtain. There are two factors affecting this data acquisition: size and speed. Newer radars are more compact to reduce weight and size. This means more of the available area on each radar is devoted to tactical input and output devices, and thus there are fewer test access input and output devices.

Conventional radar target simulators have used these test access input and output devices to reconstruct simulated targets. In the laboratory environment, the radar's tactical wire harness breakout is buffered to the local radar target simulator, but this option is not feasible on a flight line. The newer radars are also capable of greater speeds thus putting strain on the processing time-line required to reconstruct the radar pulses. In order to reconstruct the simulated targets, presently available radar systems require information regarding pulse width, code, transmit frequency, and information regarding frequency manipulation, such as frequency slopes.

Thus, there is a need for a radar target simulator that provides simulated targets on a flight line for tactical radar systems that overcomes the difficulties encountered with conventional laboratory-type target simulators. Accordingly, it is an objective of the present invention to provide a portable radar target simulator that employs fiber optic delay lines, variable power attenuation, and Doppler signal generation to provide for different simulated targets with limited radar signal access.

SUMMARY OF THE INVENTION

In order to meet the above and other objectives, the present invention is a radar target simulator for use in testing a radar system by generating simulated targets for use by the radar system. In the present simulator, the simulated targets are generated out of the radar system noise. The radar system includes a radar receiver coupled to a receive antenna. The simulator comprises input means for sampling a transmitted output signal from the radar system to provide a sampled signal. A first reference oscillator is provided for generating a first reference signal, and a first mixer is coupled to the first reference oscillator for mixing the first reference signal with the sampled signal to provide a simulated target signal. Radio frequency to optical conversion means, such as a laser, for example, is coupled to the first mixer for generating a light output signal that corresponds to the simulated target signal. A plurality of selectable delay paths that each have a different predetermined delay length are coupled to the radio frequency to optical conversion means. Light detecting means, such as a photodetector, for example, is coupled to the plurality of delay paths for converting the light output signal derived from a selected one of the delay paths into a radio frequency simulated target signal. Output means is coupled to the light detecting means for transmitting the radio frequency simulated target signal to the radar system. A variable attenuator may be coupled between the photodetector and the output means for variably controlling the power of the radio frequency simulated target signal.

The simulator may further include Doppler signal generating means that comprises a second reference oscillator for generating second and third reference signals. A third mixer is coupled to the first and second reference oscillators for mixing the first and second reference signals to produce a difference signal. A direct digital synthesizer is coupled to the second reference oscillator for receiving a command signal and the third reference signal, and for generating a Doppler output signal in response thereto. A fourth mixer is coupled to the second reference oscillator for receiving the third reference signal and to the direct digital synthesizer for receiving the Doppler signal, and for generating an intermediate Doppler signal in response thereto. A fifth mixer is coupled to the third and fourth mixers and to the output means for mixing the difference signal and the intermediate Doppler signal to produce a simulated target Doppler signal in response thereto that comprises the radio frequency simulated target signal.

The present radar target simulator is portable and is a stand alone flight line simulator capable of generating test targets for testing the readiness of an aircraft radar. The radar target simulator is radar-independent, so various radars may be tested using it. The radar target simulator may support several fixed fiber optic delay line lengths (i.e., 4 miles for short pulse testing, and greater than 12 miles for other modes) and various Doppler settings. The only connection between the simulator and the radar under test is a connection that samples the output power of the radar transmitter. Using the radar target simulator permits the radar under test to distinguish between different targets without altering its own internal voltage controlled oscillator. The simulated target may be transmitted to the radar system through its antenna which couples the simulated target to the radar system antenna, thereby testing the entire radar system.

BRIEF DESCRIPTION OF THE DRAWINGS

The various features and advantages of the present invention may be more readily understood with reference to tile following detailed description taken in conjunction with the accompanying drawings, wherein like reference numerals designate like structural elements, and in which the sole FIGURE of the drawing illustrates a portable fiber optic radar target simulator in accordance with the principles of the present invention.

DETAILED DESCRIPTION

Referring to the drawing figures, it shows a radar target simulator 10 in accordance with the principles of the present invention. The radar target simulator 10 is employed to test a radar system 40 that includes a radar receiver 41 and a receive antenna 42. The radar target simulator 10 comprises an input means 31 that provides a connection to the radar system and that samples the output power of a transmitted radar signal derived from the radar system 40 to provide a sampled signal. The radar system 40 may operate in X-band may be employed, for example.

A first reference oscillator 12 provides an 8 GHz first reference frequency signal that is mixed with the sampled signal from the radar system 40 in a first mixer 11. An output from the first mixer 11 is coupled to a laser 13, or other radio frequency to optical conversion means 13, and is adapted to provide a light output signal that corresponds to the radio frequency signal derived from the first mixer 11. The light output from the laser 13 is coupled through a fiber optic switch 19 to a plurality of delay paths 14, 15, 16 or fiber optic lines 14, 15, 16. Each of the plurality of delay paths 14 have a different delay length, such as 4 miles, 8 miles, and 12 miles, respectively, for example. Outputs of the plurality of delay paths 14 are coupled by way of a second fiber optic switch 19 to an optical to radio frequency converter 17, such as a photodetector 17, for example. The optical to radio frequency converter 17 or photodetector 17 converts the optical signals transmitted by a selected one of the plurality of delay paths 14 into a corresponding radio frequency signal.

The signal output of the optical to radio frequency converter 17 or photodetector 17 is optionally coupled through a variable attenuator 18 that is adapted to variably control the power of the simulated target signal generated by the simulator 10. The output of the variable attenuator 18, or from the optical to radio frequency converter 17 or photodetector 17 if no attenuator 18 is employed, is coupled through output means 32 to the radar system 40. The output means 32 comprises a second mixer 21, an output amplifier 22, and transmission means comprising either an antenna 28 or a coax cable 33. The simulated target signal may be transmitted from the antenna 28 to a receive antenna 42 coupled to the receiver 41 of the radar system 40, or alternatively, may be directly fed to the receiver 41 by means of the coax cable 33, for example.

The radar target simulator 10 also comprises a Doppler signal generator 30. The Doppler signal generator 30 comprises a second reference oscillator 23 for generating a 524 MHz second reference signal and a 466 MHz third reference signal. The 524 MHz second reference signal is coupled to a third mixer 24 along with the 8 GHz first reference signal from the first reference oscillator 12. The third mixer 24 is adapted to produce an 8 GHz–524 MHz difference signal. The 466 MHz third reference signal is coupled to a direct digital synthesizer 25 which produces a 58 MHz Doppler signal in response thereto and a command signal provided by an operator. The 466 MHz third reference signal and the 58 MHz Doppler signal are coupled to a fourth mixer 26. The fourth mixer 26 is adapted to produce a 524 MHz±Doppler intermediate Doppler signal. The 524 MHz±Doppler intermediate Doppler signal is coupled to a fifth mixer 27 which is adapted to mix it with the 8 GHz–524 MHz difference signal to produce an 8 GHz±Doppler signal. The 8 GHz±Doppler signal is coupled to the second mixer 21 which is adapted to mix it with the simulated target signal under control of the operator to provide an 8 GHz±Doppler simulated target signal.

Thus, it should be readily apparent that the present radar target simulator 10 may provide a plurality of simulated target signals for testing the radar system 40. These simulated target signals include simulated target signals having three different ranges provided by selection of the appropriate delay path, targets that include varying amounts of Doppler shift, and targets that have varying amounts of radiated power by using the variable attenuator. The simulated target signals may be coupled to the radar system 40 using its receive antenna 42 or coupled directly to the receiver 41 by way of the coax cable 33 or other connection. Appropriate selection of combinations of these variable attributes provides for widely varying number of simulated target signals that may be used to fully test the radar system 40, with or without the receive antenna 41 in the loop.

It should be readily appreciated that the present simulator 10 is relatively small and is therefore portable. The present simulator 10 thus permits field testing of radar systems without taking them to major test installations.

In operation, a sample of the power of the radar signal from the radar system 40 is coupled as an input to the radar target simulator 10. Assuming that the radar system 40 operates in X-band, for example, the sampled signal is downconverted to L-band, for example. The L-band signal is converted to an optical signal by the laser 13, or other radio frequency to optical conversion means 13, and is coupled to one of the three fiber optic delay lines 14, 15, 16. However, it is to be understood that the present invention is not limited to only three delay paths, and any number of delay paths may be employed, depending upon design requirements.

The three fiber optic delay lines 14, 15, 16 allow the operator to choose a range for the simulated target that are used for various radar processing tests. The selection of the appropriate range (delay) is controlled via the switch 19, which may located on a front panel of the simulator 10, for example. The Doppler signal may also be selected by way of a switch 29 which may be located on the front panel of the simulator 10, for example. By operating the switch 29, a twenty-five bit command is sent to the direct digital synthesizer 25 the uses the 466 MHz third reference signal from the second oscillator 23 to create the Doppler signal on the 58 MHz signal. When the Doppler signal is mixed with the 466 MHz third reference signal, and filtered, it creates the intermediate Doppler signal (524 MHz±Doppler signal). The second oscillator also creates a pure 524 MHz second reference signal that is subtracted from the 8 GHz first reference signal used to downconvert the sampled signal from the radar system 40. The intermediate Doppler signal (524 MHz±Doppler signal) is then added to the 8 GHz–524 MHz difference signal, and the resultant signal is the simulated target Doppler signal (8 GHz±Doppler signal) provided at the output of the fourth mixer 27. This simulated target Doppler signal is then mixed with the delayed L-band signal and filtered, and a delayed reproduction of the radar's transmitted signal plus Doppler is transmitted as tile simulated target signal from the antenna 28, or fed directly into a main channel of the radar receiver 41. The variable attenuator 18, which also may be located on the front panel of the simulator 10, is provided for varying simulated target power. The L-band signal passing through the selected fiber optic delay path 14, 15, 16 retains the characteristics of the original transmitted signal derived from the radar system 10 even if that signal is a very complex waveform, such as is provided by a stretch or chirp waveform, for example. Frequency ranging is performed with a real time delay so that any irregularities in the frequency slopes may be detected.

Thus there has been described a new and improved radar target simulator that employs fiber optic delay lines, variable power attenuation, and Doppler signal generation to provide for different simulated targets. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A radar target simulator for use in testing a radar system that includes a radar receiver coupled to a receive antenna, said simulator comprising:

input means for sampling a transmitted output signal from the radar system to provide a sampled signal;

a first reference oscillator for generating a first reference signal;

a first mixer coupled to the first reference oscillator for mixing the first reference signal with the sampled signal to provide a simulated target signal;

radio frequency to optical conversion means coupled to the first mixer for generating a light output signal that corresponds to the simulated target signal;

a plurality of selectable delay paths that each have a different predetermined delay length coupled to the radio frequency to optical conversion means;

light detecting means coupled to the plurality of delay paths for converting the light output signal derived from a selected one of the delay paths into a radio frequency simulated target signal;

output means coupled to the light detecting means for transmitting the radio frequency simulated target signal to the radar system; and Doppler signal generating means comprising
  (i) a second reference oscillator for generating a second reference signal and a third reference signal,
  (ii) a second mixer coupled to the first and second reference oscillators for mixing the first reference signal and the second reference signal to produce a difference signal,
  (iii) a direct digital synthesizer coupled to the second reference oscillator for receiving a command signal and the third reference signal, and for generating a Doppler output signal in response thereto,
  (iv) a third mixer coupled to the second reference oscillator for receiving the third reference signal and to the direct digital synthesizer for receiving the Doppler signal, and for generating an intermediate Doppler signal in response thereto, and
  (v) a fourth mixer coupled to the second and third mixers and to the output means for mixing the difference signal and the intermediate Doppler signal to produce a simulated target Doppler signal in response thereto that comprises the radio frequency simulated target signal.

2. The simulator of claim 1 which further comprises a variable attenuator coupled between the light detecting means and the output means for variably controlling the power of the simulated target signal.

3. The simulator of claim 1 wherein the output means comprises a fifth mixer coupled through an output amplifier to an antenna.

4. The simulator of claim 1 wherein the output means comprises a fifth mixer coupled through an output amplifier to a radio frequency coupling means coupled to the radar system.

5. The simulator of claim 1 wherein the radio frequency to optical conversion means comprises a laser.

6. The simulator of claim 1 wherein the light detecting means comprises a photodetector.

7. A radar target simulator for use in testing a radar system that includes a radar receiver coupled to a receive antenna, said simulator comprising:

input means for sampling a transmitted output signal from the radar system to provide a sampled signal;

a first reference oscillator for generating a first reference signal;

a first mixer coupled to the first reference oscillator for mixing the first reference signal with the sampled signal to provide a simulated target signal;

radio frequency to optical conversion means coupled to the first mixer for generating a light output signal that corresponds to the simulated target signal;

a plurality of selectable delay paths coupled to the radio frequency to optical conversion means and wherein each of the plurality of delay paths has a different predetermined delay length;

light detecting means coupled to the plurality of delay paths for converting the light output signal derived from a selected one of the delay paths into a radio frequency signal corresponding to the simulated target signal;

a variable attenuator coupled to the light detecting means for variably controlling the power of the simulated target signal;

output means coupled to the variable attenuator for transmitting the simulated target signal to the radar system; and Doppler signal generating means comprising
  (i) a second reference oscillator for generating a second reference signal and a third reference signal,
  (ii) a second mixer coupled to the first and second reference oscillators for mixing the first reference signal and the second reference signal to produce a difference signal,
  (iii) a direct digital synthesizer coupled to the second reference oscillator for receiving a command signal and the third reference signal, and for generating a Doppler output signal in response thereto,
  (iv) a third mixer coupled to the second reference oscillator for receiving the third reference signal and to the direct digital synthesizer for receiving the Doppler signal, and for generating an intermediate Doppler signal in response thereto, and
  (v) a fourth mixer coupled to the second and third mixers and to the output means for mixing the difference signal and the intermediate Doppler signal to produce a simulated target Doppler signal in response thereto that comprises the radio frequency simulated target signal.

8. The simulator of claim 7 wherein the output means comprises a fifth mixer coupled through an output amplifier to an antenna.

9. The simulator of claim 7 wherein the output means comprises a fifth mixer coupled through an output amplifier to a radio frequency coupling means coupled to the radar system.

10. The simulator of claim 7 wherein the radio frequency to optical conversion means comprises a laser.

11. The simulator of claim 7 wherein the light detecting means comprises a photodetector.

12. A radar target simulator for use in testing a radar system that includes a radar receiver coupled to a receive antenna, said simulator comprising:

input means for sampling a transmitted output signal from the radar system to provide a sampled signal;

a first reference oscillator for generating a first reference signal;

a first mixer coupled to the first reference oscillator for mixing the first reference signal with the sampled signal to provide a simulated target signal;

radio frequency to optical conversion means coupled to the first mixer for generating a light output signal that corresponds to the simulated target signal;

a plurality of selectable delay paths coupled to the radio frequency to optical conversion means and wherein each of the plurality of delay paths has a different predetermine delay length;

light detecting means coupled to the plurality of delay paths for converting the light output signal derived from a selected one of the delay paths into a radio frequency signal corresponding to the simulated target signal;

a variable attenuator coupled to the light detecting means for variably controlling the power of the simulated target signal;

output means coupled to the variable attenuator for transmitting the simulated target signal to the radar system; and Doppler signal generating means coupled to the first reference oscillator and to the output means for generating a Doppler signal that is combined with the simulated target signal to provide a simulated Doppler target signal, wherein the Doppler signal generating means comprises (i) a second reference oscillator for generating a second reference signal and a third reference signal, (ii) a second mixer coupled to the first and second reference oscillators for mixing the first reference signal and the second reference signal to produce a difference signal, (iii) a direct digital synthesizer coupled to the second reference oscillator for receiving a command signal and the third reference signal, and for generating a Doppler output signal in response thereto, (iv) a third mixer coupled to the second reference oscillator for receiving the third difference signal and to the direct digital synthesizer for receiving the Doppler signal, and for generating an intermediate Doppler signal in response thereto, (v) a fourth mixer coupled to the second and third mixers and to the output means for mixing the difference signal and the intermediate Doppler signal to produce a simulated target Doppler signal in response thereto that comprises the simulated target signal.

13. The simulator of claim 14 wherein the output means comprises a fifth mixer coupled through an output amplifier to an antenna.

14. The simulator of claim 12 wherein the output means comprises a fifth mixer coupled through an output amplifier to a radio frequency coupling means coupled to the radar system.

15. The simulator of claim 12 wherein the radio frequency to optical conversion means comprises a laser.

16. The simulator of claim 12 wherein the light detecting means comprises a photodetector.

* * * * *